(12) United States Patent
Fujioka et al.

(10) Patent No.: US 8,007,680 B2
(45) Date of Patent: Aug. 30, 2011

(54) ELECTROLYTE SOLUTION FOR ELECTROCHEMICAL DEVICE AND ELECTROCHEMICAL DEVICE USING SAME

(75) Inventors: Koji Fujioka, Kyoto (JP); Yoshihiko Akazawa, Kyoto (JP); Yasuyuki Ito, Osaka (JP); Satomi Onishi, Osaka (JP)

(73) Assignees: Sanyo Chemical Industries, Ltd., Kyoto-shi (JP); Panasonic Corporation, Osaka (JP)

( * ) Notice: Subject to any disclaimer, the term of this patent is extended or adjusted under 35 U.S.C. 154(b) by 618 days.

(21) Appl. No.: 12/088,818

(22) PCT Filed: Sep. 28, 2006

(86) PCT No.: PCT/JP2006/319337
§ 371 (c)(1),
(2), (4) Date: Oct. 20, 2008

(87) PCT Pub. No.: WO2007/037337
PCT Pub. Date: Apr. 5, 2007

(65) Prior Publication Data
US 2009/0289211 A1 Nov. 26, 2009

(30) Foreign Application Priority Data
Sep. 29, 2005 (JP) ................................. 2005-284070

(51) Int. Cl.
*H01B 1/06* (2006.01)
(52) U.S. Cl. ....... 252/62.2; 361/502; 361/505; 429/188; 429/324; 429/337; 429/338; 429/339; 429/340; 429/342
(58) Field of Classification Search ................. 252/62.2; 361/502, 505; 429/188, 324, 337, 338, 339, 429/340, 342
See application file for complete search history.

(56) References Cited

U.S. PATENT DOCUMENTS

| 7,099,146 B2 * | 8/2006 | Kobayashi et al. ............ 361/523 |
| 7,227,738 B2 * | 6/2007 | Takeda et al. ................. 361/503 |
| 2005/0127319 A1 | 6/2005 | Fujioka et al. |

FOREIGN PATENT DOCUMENTS

| JP | 08-321439 A | 12/1996 |
| JP | 2004-207451 A | 7/2004 |
| JP | 2005-197665 A | 7/2005 |
| JP | 2005-197666 A | 7/2005 |
| WO | WO 95/15572 A1 | 6/1995 |
| WO | WO 2004/017344 | * 2/2004 |
| WO | WO 2004/040605 | * 5/2004 |

OTHER PUBLICATIONS

International Search Report of PCT/JP2006/319337, date of mailing Dec. 26, 2006.
Korean Office Action dated Mar. 18, 2010, issued in corresponding Korean Patent Application No. 10-2008-7010267.

* cited by examiner

*Primary Examiner* — Carol M Koslow
(74) *Attorney, Agent, or Firm* — Westerman, Hattori, Daniels & Adrian, LLP

(57) ABSTRACT

The present invention has for its object to provide an electrolyte solution which can dramatically suppress the time degradation in performance of an electrochemical device, especially an electrochemical capacitor.

The present invention relates to
an electrolyte solution for electrochemical device
which comprises an imidazolium salt (A) represented by the general formula (1) as a main component,
wherein the content of the imidazolium salt (B) represented by the general formula (2) is not more than 15% by weight to the total weight of the imidazolium salt (A) and imidazolium salt (B);

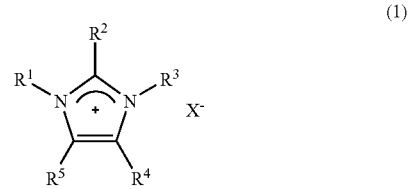

(1)

(in the formula, $R^1$, $R^2$ and $R^3$ may be the same or different and each represents an alkyl group containing 1 to 3 carbon atoms; $R^4$ and $R^5$ may be the same or different and each represents an hydrogen atom or an alkyl group containing 1 to 3 carbon atoms; and $X^-$ represents a counter anion)

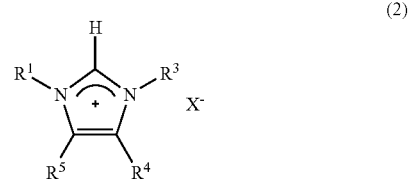

(2)

(in the formula, $R^1$, $R^3$, $R^4$, $R^5$ and $X^-$ are the same as the definition for the general formula (1)).

10 Claims, No Drawings

ELECTROLYTE SOLUTION FOR ELECTROCHEMICAL DEVICE AND ELECTROCHEMICAL DEVICE USING SAME

TECHNICAL FIELD

The present invention relates to an electrolyte solution for electrochemical device and an electrochemical device using the same. More particularly, the present invention relates to an electrochemical device, especially an electrochemical capacitor, which can suitably be used as a memory backup in various electronics and as a power source for a high current-requiring electric vehicle, and an electrolyte solution suitably used in the same.

BACKGROUND ART

As an electrolyte solution for electrochemical device, a nonaqueous electrolyte solution for electrochemical capacitor comprising a solution of a cyclic amidinium salt in propylene carbonate as a solvent has been known (Patent Document 1 and Patent Document 2).

Conventional nonaqueous electrolyte solutions do not have sufficient electric strength in some cases, so that an electrochemical device, especially an electrochemical capacitor, which contains such electrolyte solution sometimes causes marked time degradation in its performance.

Patent Document 1: International Publication WO95/15572

Patent Document 2: Japanese Kokai Publication 2005-197666

SUMMARY OF THE INVENTION

That is, the present invention has for its object to provide an electrolyte solution which can dramatically suppress the time degradation in performance of an electrochemical device.

The present inventors made intensive investigations to solve such problems as mentioned above and, as a result, they completed the present invention.

That is, the present invention relates to an electrolyte solution for electrochemical device which comprises an imidazolium salt (A) represented by the general formula (1) as a main component and an imidazolium salt (B) represented by the general formula (2), wherein the content of the imidazolium salt (B) represented by the general formula (2) is not more than 15% by weight to the total weight of the imidazolium salt (A) and imidazolium salt (B);

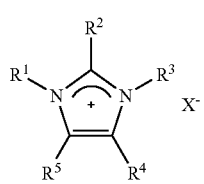

(1)

(in the formula, $R^1$, $R^2$ and $R^3$ may be the same or different and each represents an alkyl group containing 1 to 3 carbon atoms; $R^4$ and $R^5$ may be the same or different and each represents an hydrogen atom or an alkyl group containing 1 to 3 carbon atoms; and $X^-$ represents a counter anion)

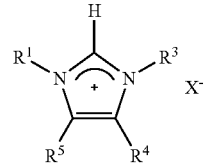

(2)

(in the formula, $R^1$, $R^3$, $R^4$, $R^5$ and $X^-$ are the same as the definition for the general formula (1)).

The present invention further relates to an electrochemical device and an electric double layer condenser which comprises the electrolyte solution mentioned above.

DETAILED DESCRIPTION OF THE INVENTION

Hereinafter, the present invention is described in detail.

The electrolyte solution for electrochemical device according to the present invention comprises an imidazolium salt (A) represented by the general formula (1) as a main component and an imidazolium salt (B) represented by the general formula (2), wherein the content of the imidazolium salt (B) represented by the general formula (2) is not more than 15% by weight to the total weight of the imidazolium salt (A) and imidazolium salt (B).

As the alkyl group containing 1 to 3 carbon atoms represented as $R^1$ to $R^5$ in the general formulae (1) and (2), there may be mentioned a methyl group, an ethyl group, a propyl group, and an isopropyl group.

The imidazolium salt (A) represented by the above general formula (1) may be generally obtained by quaternizing an imidazole (a) represented by the general formula (3) with an alkylation agent (c) such as dialkyl carbonate or alkyl chloride, and then performing a salt-exchanging reaction of the obtained carbonate or chloride in order to obtain a salt wherein a carbonate ion or a chloride ion thereof is replaced with a counter anion;

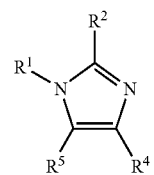

(3)

(in the formula, $R^1$, $R^2$, $R^4$ and $R^5$ are the same as the definition for the general formula (1)).

The imidazole (a) may be obtained by, for example, reacting α-dicarbonyl compound or its acetals or ketals (d1), ammonia or its carbonates (d2), aldehydes (d3), and primary amines (d4). Details of the production process thereof are described in e.g. Japanese Kokai Publication 2004-207451. By the above reaction, an imidazole (b) represented by the general formula (4) is produced together with the imidazole (a). The imidazole (a) may be obtained together with the imidazole (b) which is produced at the ratio of, for example, about 16 to 35% by weight to the total weight of the imidazole (a) and (b);

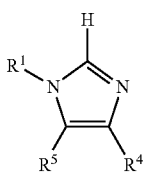

(4)

(in the formula, $R^1$, $R^4$ and $R^5$ is the same as the definition for the general formula (1)).

Moreover, the imidazole (a) may also be obtained by alkylating an imidazole (e) represented by the general formula (5). The imidazole (e) may be obtained by, for example, reacting α-dicarbonyl compound or its acetals or ketals (d1), ammonia or its carbonate (d2), and aldehydes (d3). By the above reaction, the imidazole (e) may be obtained together with an imidazole (f) represented by the general formula (6) which is produced at the ratio of, for example, about 16 to 35% by weight to the total weight of the imidazole (e) and (f). Therefore, also in this case, the imidazole (a) is obtained together with the imidazole (b) represented by the general formula (4) which is produced at the ratio of, for example, about 16 to 35% by weight to the total weight of (a) and (b);

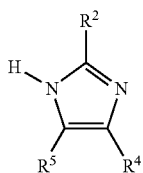

(5)

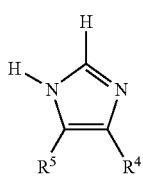

(6)

(in the general formulae (5) and (6), $R^2$, $R^4$ and $R^5$ are the same as the definition for the general formula (1)).

The imidazolium salt (A) produced from the imidazole (a) is obtained together with the imidazolium salt (B) which is produced at the ratio of, for example, about 16 to 35% by weight to the total weight of the imidazolium salt (A) and (B), when (a) is produced by the above-mentioned process.

The present inventors succeeded in finding an electrolyte solution for electrochemical device which shows only slight time degradation in its performance by reducing the content of the imidazolium salt (B) coexisting with the imidazolium salt (A).

The electrolyte solution for electrochemical device of the present invention comprises the imidazolium salt (A) as a main component, wherein the content of the imidazolium salt (B) is not more than 15% by weight, preferably not more than 10% by weight, more preferably not more than 5% by weight, still more preferably not more than 2% by weight, particularly preferably not more than 1.7% by weight, further particularly preferably not more than 1.5% by weight, most preferably not more than 1% by weight, while preferably not lower than 0.1% by weight, and more preferably not lower than 0.4% by weight to the total weight of (A) and (B).

When the content of (B) exceeds 15% by weight to the total weight of (A) and (B), the time degradation in performance cannot be sufficiently suppressed.

The expression "comprising the imidazolium salt (A) as a main component" means that the imidazolium salt (A) accounts for not lower than 50% by weight in electrolytes constituting the electrolyte solution of the present invention.

As a process for reducing the content of the imidazolium salt (B) to not more than 15% by weight to the total weight of the imidazolium salt (A) and (B) in the mixture of (A) and (B), there may be mentioned, for example, a process of distilling off the imidazole (b) from a material mixture of the imidazole (a) and imidazole (b).

The distillation can be carried out at a temperature range of 50° C. to 210° C. and a pressure of not higher than 30 kPA.

As a process for reducing the content of (B) to not more than 15% by weight to the total weight of (A) and (B), there may also be mentioned, for example, a process of removing the imidazole (f) from a mixture of the imidazole (e) and imidazole (f), which are materials of the imidazole (a) and imidazole (b), by recrystallization, distillation, etc.

As the imidazolium salt (A), salts comprising the cations mentioned below, and the like, are included.

(1) 1,2,3-position derivatives 1,2,3-trimethylimidazolium, 1-ethyl-2,3-dimethylimidazolium, 1,3-dimethyl-2-ethylimidazolium, 1,2-diethyl-3-methylimidazolium, 1,3-diethyl-2-methylimidazolium, 1,2,3-triethylimidazolium, 1-propyl-2,3-dimethylimidazolium, 1-isopropyl-2,3-dimethylimidazolium, etc.

(2) 1,2,3,4-position derivatives 1,2,3,4-tetramethylimidazolium, 1-ethyl-2,3,4-trimethylimidazolium, 2-ethyl-1,3,4-trimethylimidazolium, 1,2-diethyl-3,4-dimethylimidazolium, 1,3-diethyl-2,4-dimethylimidazolium, 1,2-dimethyl-3,4-diethylimidazolium, 1,2,3-triethyl-4-methylimidazolium, 1,2,3-trimethyl-4-ethylimidazolium, 1,2,4-trimethyl-3-ethylimidazolium, 1,4-diethyl-2,3-dimethylimidazolium, 2,4-diethyl-1,3-dimethylimidazolium, 1,2,4-triethyl-3-methylimidazolium, 1,3,4-triethyl-2-methylimidazolium, 1,2,3,4-tetraethylimidazolium, 1-propyl-2,3,4-trimethylimidazolium, 1-isopropyl-2,3,4-trimethylimidazolium, etc.

(3) 1,2,3,5-position derivatives 1,2,3,5-tetramethylimidazolium, 1-ethyl-2,3,5-trimethylimidazolium, 1,2-diethyl-3,5-dimethylimidazolium, 1,3-diethyl-2,5-dimethylimidazolium, 1,5-diethyl-2,3-dimethylimidazolium, 1,2,5-triethyl-3-methylimidazolium, 1,3,5-triethyl-2-methylimidazolium, 1-propyl-2,3,5-trimethylimidazolium, 1-isopropyl-2,3,5-trimethylimidazolium, etc.

(4) 1,2,3,4,5-position derivatives 1,2,3,4,5-pentamethylimidazolium, 1-ethyl-2,3,4,5-tetramethylimidazolium, 2-ethyl-1,3,4,5-tetramethylimidazolium, 3-ethyl-1,2,4,5-tetramethylimidazolium, 4-ethyl-1,2,3,5-tetramethylimidazolium, 1,2,3,4,5-pentaethylimidazolium, 1-propyl-2,3,4,5-tetramethylimidazolium, 1-isopropyl-2,3,4,5-tetramethylimidazolium, etc.

Among these cations, in view of the electric strength, solubility, etc., those cations of (1) 1,2,3-position derivatives, (2) 1,2,3,4-position derivatives and (3) 1,2,3,5-position derivatives are preferred, and more preferred are (1) and (2).

Among (1) and (2), particularly preferred are those having a methyl group at the 2-position, more preferred are 1,2,3-trimethylimidazolium, 1,2,3,4-tetramethylimidazolium and 1-ethyl-2,3-dimethylimidazolium, still more preferred are 1,2,3-trimethylimidazolium and 1-ethyl-2,3-dimethylimidazolium, and most preferred is 1-ethyl-2,3-dimethylimidazolium.

Moreover, among the cations mentioned above, preferred are those wherein at least one alkyl group among alkyl groups as $R^1$, $R^2$ and $R^3$ in the general formula (1) is different from the other ones. "Those wherein at least one alkyl group among alkyl groups as $R^1$, $R^2$ and $R^3$ in the general formula (1) is different from the other ones" include those wherein two alkyl groups among $R^1$, $R^2$ and $R^3$ are the same and the other is different from these two, and those wherein each alkyl group as $R^1$, $R^2$ and $R^3$ is different each other. Specific examples of such cations include 1-ethyl-2,3-dimethylimidazolium, 1,3-dimethyl-2-ethylimidazolium, 1,2-diethyl-3-methylimidazolium, 1,3-diethyl-2-methylimidazolium, 1-ethyl-2,3,4-trimethylimidazolium, 1-ethyl-2,3,5-trimethylimidazolium, 1-ethyl-2-methyl-3-propylimidazolium, and the like.

Preferred as the counter anion $X^-$ are anions represented by $PF_6^-$, $BF_4^-$, $AsF_6^-$, $SbF_6^-$, $N(RfSO_2)_2^-$, $C(RfSO_2)_3^-$, $RfSO_3^-$ (Rf is a fluoroalkyl group containing 1 to 12 carbon atoms), $N(FSO_2)_2^-$, $F^-$, $ClO_4^-$, $AlF_4^-$, $AlCl_4^-$, $TaF_6^-$, $NbF_6^-$, $SiF_6^-$, $CN^-$ or $F(HF)_n^-$ (n is a number of 1 to 4). More preferred are, in view of the electric strength or the like, anions represented by $PF_6^-$, $BF_4^-$ or $N(RfSO_2)_2^-$, particularly preferred are anions represented by $PF_6^-$ or $BF_4^-$, and most preferred is an anion represented by $BF_4^-$. Additionally, Rf contained in the anions represented by $N(RfSO_2)_2^-$, $C(RfSO_2)_3^-$ and $RfSO_3^-$ represents a fluoroalkyl group containing 1 to 12 carbon atoms, and trifluoromethyl, pentafluoroethyl, heptafluoropropyl, nonafluorobutyl, and the like are included. Among these, trifluoromethyl, pentafluoroethyl and heptafluoropropyl are preferred, more preferred are trifluoromethyl and pentafluoroethyl, and particularly preferred is trifluoromethyl.

Preferred examples of the imidazolium salt (A) include 1,2,3-trimethylimidazolium tetrafluoroborate ($BF_4^-$ salt), 1,2,3,4-tetramethylimidazolium tetrafluoroborate, 1-ethyl-2,3-dimethylimidazolium tetrafluoroborate, 1,2,3-trimethylimidazolium hexafluorophosphate ($PF_6^-$ salt), 1,2,3,4-tetramethylimidazolium hexafluorophosphate, 1-ethyl-2,3-dimethylimidazolium hexafluorophosphate, and the like.

Examples of the imidazolium salt (B) include those in which an alkyl group at 2-position in the corresponding imidazolium salt (A) is substituted with a hydrogen atom.

Specifically, as the imidazolium salt (B), salts comprising the cations mentioned below, and the like, are included.
(1) 1,3-position derivatives 1,3-dimethylimidazolium, 1-ethyl-3-methylimidazolium, 1,3-diethylimidazolium, 1-propyl-3-methylimidazolium, 1-isopropyl-3-methylimidazolium, etc.
(2) 1,3,4-position derivatives 1,3,4-trimethylimidazolium, 1-ethyl-3,4-dimethylimidazolium, 3-ethyl-1,4-dimethylimidazolium, 1,3-diethyl-4-methylimidazolium, 1,3-dimethyl-4-ethylimidazolium, 1,4-diethyl-3-methylimidazolium, 3,4-diethyl-1-methylimidazolium, 1,3,4-triethylimidazolium, 1-propyl-3,4-dimethylimidazolium, 1-isopropyl-3,4-dimethylimidazolium, etc.
(3) 1,3,5-position derivatives 1,3,5-trimethylimidazolium, 1-ethyl-3,5-dimethylimidazolium, 1,3-diethyl-5-methylimidazolium, 1,5-diethyl-3-methylimidazolium, 1,3,5-triethylimidazolium, 1-propyl-3,5-dimethylimidazolium, 1-isopropyl-3,5-dimethylimidazolium, etc.
(4) 1,3,4,5-position derivatives 1,3,4,5-tetramethylimidazolium, 1-ethyl-3,4,5-trimethylimidazolium, 3-ethyl-1,4,5-trimethylimidazolium, 4-ethyl-1,3,5-trimethylimidazolium, 1,3,4,5-tetraethylimidazolium, 1-propyl-3,4,5-trimethylimidazolium, 1-isopropyl-3,4,5-trimethylimidazolium, etc.

As the combination examples of the imidazolium salt (A) and imidazolium salt (B), there may be mentioned a combination of 1,2,3-trimethylimidazolium tetrafluoroborate and 1,3-dimethylimidazolium tetrafluoroborate, a combination of 1,2,3,4-tetramethylimidazolium tetrafluoroborate and 1,3,4-trimethylimidazolium tetrafluoroborate, a combination of 1-ethyl-2,3-dimethylimidazolium tetrafluoroborate and 1-ethyl-3-methylimidazolium tetrafluoroborate, and the like.

The content of the imidazolium salt (A) and imidazolium salt (B) can be determined by high-performance liquid chromatography (HPLC). The HPLC conditions are as follows; column: one filled with a polymer-coated filler, mobile phase: phosphate buffer (pH 2 to 3), flow rate: 0.5 ml/min, detector: UV, and temperature: 40° C. (e.g., apparatus: type (LC-10A), manufacturer (Shimadzu Corporation), column: Develosil C30-UG (4.6 mm$\phi$×25 cm), manufacturer (Nomura Chemical Co., Ltd.), mobile phase: an aqueous solution having a phosphoric acid content of 10 mmol/l and a sodium perchlorate content of 100 mmol/l, flow rate: 0.8 ml/min, detector: UV (210 nm), injection amount: 20 µl, and column temperature: 40° C.). The weight ratio of (A) to (B) is calculated using a calibration curve.

The contents of the imidazole (a) and imidazole (b), and the imidazole (e) and imidazole (f) can also be determined and calculated by the same method as mentioned above.

The content of the imidazolium salt (A) and imidazolium salt (B) in the electrolyte solution of the present invention is preferably 5 to 70%, more preferably 10 to 60% based on the weight of the electrolyte solution.

The electrolyte solution of the present invention may contain a nonaqueous solvent. Conventional nonaqueous solvents can be used, and an appropriate one can be selected in view of the solubility of imidazolium salt (A) and the electrochemical stability. For example, those mentioned below are included. It is also possible to use two or more of them in combination.

Ethers: acyclic ethers containing 4 to 12 carbon atoms (diethyl ether, methyl isopropyl ether, ethylene glycol dimethyl ether, diethylene glycol dimethyl ether, triethylene glycol diethyl ether, tetraethylene glycol diethyl ether, diethylene glycol diethyl ether, triethylene glycol dimethyl ether, etc.), cyclic ethers containing 4 to 12 carbon atoms {tetrahydrofuran, 1,3-dioxolane, 1,4-dioxane, 4-butyldioxolane, crown ether (1,4,7,10,13,16-hexaoxacyclooctadecane, etc.), etc.}, etc.

Amides: acyclic amides containing 3 to 6 carbon atoms (N,N-dimethyl formamide, N,N-dimethyl acetoamide, N,N-dimethyl propionamide, hexamethyl phosphoryl amide, etc.), cyclic amides containing 4 to 6 carbon atoms (pyrrolidinone, N-methylpyrrolidinone, N-vinylpyrrolidinone, etc.), etc.

Carboxylates: acyclic esters containing 3 to 8 carbon atoms (methyl acetate, methyl propionate, dimethyl adipate, etc.), cyclic esters containing 4 to 5 carbon atoms (γ-butyrolactone, α-acetyl-γ-butyrolactone, β-butyrolactone, γ-valerolactone, δ-valerolactone, etc.), etc.

Nitriles: nitriles containing 2 to 5 carbon atoms (acetonitrile, glutaronitrile, adiponitrile, methoxyacetonitrile, 3-methoxypropionitrile, 3-ethoxypropionitrile, acrylonitrile, etc.), etc.

Carbonates: acyclic carbonates containing 3 to 5 carbon atoms (dimethyl carbonate, ethylmethyl carbonate, diethyl carbonate, etc.), cyclic carbonates containing 3 to 5 carbon atoms (ethylene carbonate, propylene carbonate, butylene carbonate, vinylene carbonate, etc.), etc.

Sulfoxides: acyclic sulfoxides containing 2 to 6 carbon atoms (dimethyl sulfoxide, dipropyl sulfoxide, etc.), etc.

Sulfones: cyclic sulfones containing 4 to 6 carbon atoms (sulfolane, 3-methyl sulfolane, 2,4-dimethyl sulfolane, etc.), etc.

Nitro compounds: nitromethane, nitroethane, etc.

Other cyclic compounds: N-methyl-2-oxazolidinone, 3,5-dimethyl-2-oxazolidinone, 1,3-dimethyl-2-imidazolidinone, etc.

Among these, preferred are carbonates, sulfones, carboxylates and nitriles, more preferred are carbonates, sulfones and nitriles, particularly preferred are ethylene carbonate, propylene carbonate and sulfolane, and most preferred are propylene carbonate and sulfolane. These nonaqueous solvents can be used singly or as a mixture comprising two or more species. When a mixture is used, it is preferable to use, as a main component, at least one species selected from the group consisting of propylene carbonate, ethylene carbonate, butylene carbonate, sulfolane, methyl sulfolane, acetonitrile, γ-butyrolactone, dimethyl carbonate, ethylmethyl carbonate and diethylcarbonate. It is more preferable to use at least one species selected from the group consisting of propylene carbonate, ethylene carbonate, sulfolane, acetonitrile and γ-butyrolactone as a main component, and particularly preferably, at least one species selected from the group consisting of propylene carbonate, sulfolane and acetonitrile is used as a main component. Herein, the expression "used as a main component" means that the component in question is contained at a ratio of 50 to 99% by weight, preferably 70 to 90% by weight in the nonaqueous solvent.

When at least one species selected from the group consisting of propylene carbonate, ethylene carbonate, sulfolane, acetonitrile and γ-butyrolactone is used as a main component, as mentioned above, it is preferable to use at least one species selected form the group consisting of dimethyl carbonate, ethylmethyl carbonate and diethyl carbonate as an auxiliary solvent. As an auxiliary solvent, more preferred are dimethyl carbonate and ethylmethyl carbonate, and particularly preferred is dimethyl carbonate. Herein, the expression "to be used as an auxiliary solvent" means that the component in question is contained at a ratio of 1 to 50% by weight, more preferably 10 to 30% by weight in the nonaqueous solvent.

The content (% by weight) of nonaqueous solvent in the electrolyte solution is preferably 30 to 95% by weight, more preferably 40 to 90% by weight, particularly preferably 50 to 85% by weight, and most preferably 60 to 80% by weight based on the weight of the electrolyte solution. Within this range, salt deposition less likely to occur at a low temperature, and the time degradation in performance of the electrochemical capacitor can be further suppressed.

The water content (ppm) in the electrolyte solution of the present invention is preferably not more than 300 ppm, more preferably not more than 100 ppm, and particularly preferably not more than 50 ppm based on the volume of electrolyte solution in view of the electrochemical stability. Within this range, the time degradation in performance of the electrochemical capacitor can be suppressed. The water content of electrolyte solution can be determined by Karl Fischer technique (JIS K0113-1997, a coulometric titration technique).

For adjusting the water content in electrolyte solution to fall within the above-mentioned range, there may be mentioned, for example, a process comprising using the imidazolium salt (A) sufficiently dried in advance and a nonaqueous solvent sufficiently dehydrated in advance. For drying (A), there may be mentioned, for example, a process comprising drying by heating under reduced pressure (e.g. heating at 150° C. under a reduced pressure of 20 Torr) to evaporate off a small amount of water contained therein.

For dehydrating a nonaqueous solvent, there may be mentioned, for example, a process comprising dehydration by heating under reduced pressure (e.g. heating at 130° C. under a reduced pressure of 100 Torr (when the nonaqueous solvent is propylene carbonate)) to evaporate off a small amount of water contained therein, and a process comprising using a dewatering agent such as a molecular sieve (manufactured by Nacalai Tesque, Inc. 3A 1/16, etc.) or activated aluminum powders.

In addition to those processes mentioned above, there may also be mentioned, for example, a process comprising dehydration of the electrolyte solution by heating under reduced pressure (e.g., heating at 100° C. under reduced pressure of 100 Torr) to evaporate off a small amount of water contained, and a process comprising using a dewatering agent such as a molecular sieve or activated aluminum powders. These processes may be conducted singly or two or more processes may be conducted in combination. Among these, preferred are the process comprising drying (A) by heating under reduced pressure, and the process comprising addition of a molecular sieve to the electrolyte solution.

The electrolyte solution of the present invention can be used in an electrochemical device, especially an electrochemical capacitor. In the present invention, an electrochemical device includes an electrochemical capacitor, electrochemical battery, electrochemical sensor, and the like. The electrochemical capacitor is, as its components, equipped with an electrode, current collector and separator, and also arbitrarily equipped with a case and gasket which are usually used for a capacitor. The electrolyte solution is impregnated into an electrode and separator in a glove box, etc. under argon gas atmosphere (dew point −50° C.). The electrolyte solution of the present invention is suitably used in an electric double layer condenser (one comprising a polarizable electrods, e.g. activated carbon, etc. as an electrode) among electrochemical capacitors.

The basic structure of an electric double layer condenser comprises two polarizable electrodes having a separator impregnated with an electrolyte solution therebetween. The main component of the polarizable electrodes is preferably a carbonaceous material such as activated carbon, graphite, and polyacene type organic semiconductor from the viewpoint that those are electrochemically inactive to an electrolyte solution and have adequate electric conductivity. And at least one of cathode and anode is a carbonaceous material. From the viewpoint of having a large electrode interface for accumulating electric charge, a porous carbon substance having the specific surface area obtained by the BET method according to the nitrogen adsorption method of not less than 10 $m^2/g$ (e.g. activated carbon) is more preferred. The specific surface area of a porous carbon substance is selected by accounting the intended electrostatic capacity per unit area ($F/m^2$) and decrease of the bulk density following with increase of the specific surface area. Those having the specific surface area obtained by the BET method according to the nitrogen adsorption method of 30 to 2,500 $m^2/g$ are preferred, and activated carbon having the specific surface area of 300 to 2,300 $m^2/g$ are particularly preferred since those have large electrostatic capacity per volume.

The electrolyte solution of the present invention can also be suitably used in an aluminum electrolysis condenser. The basic structure of an aluminum electrolysis condenser comprises two aluminum foil electrodes, one of which is a dielectric having an oxide membrane on its surface made by electrochemical treatment, and having, between these two electrodes, an electrolytic paper impregnated with an electrolyte solution.

According to the present invention, the aspects of electrochemical capacitor include a coin type, spiral type, square type, and the like. The electrolyte solution of the present invention can be applied to any type of electric double layer condensers and aluminum electrolytic condensers.

EFFECT OF THE INVENTION

The electrolyte solution for electrochemical device of the present invention has exceedingly high electric strength, and therefore may be used for producing an electrochemical device which causes only slight time degradation in its performance. Accordingly, by using the electrolyte solution of the present invention, the energy density of an electrochemical device, especially an electrochemical capacitor can be dramatically improved.

BEST MODE FOR CARRYING OUT THE INVENTION

The following Examples and Comparative Examples illustrate the present invention more specifically. These examples are, however, by no means limitative of the scope of the invention. In the following, "part(s)" means "part(s) by weight", and "%" means "% by weight" unless otherwise specified. The conditions of HPLC in Examples are as follows; apparatus: type (LC-10A), manufacturer (Shimadzu Corporation), column: Develosil C30-UG (4.6 mm$\phi$×25 cm), manufacturer (Nomura Chemical Co., Ltd.), mobile phase: an aqueous solution having a phosphoric acid content of 10 mmol/l and a sodium perchlorate content of 100 mmol/l, flow rate: 0.8 ml/min, detector: UV (210 nm), injection amount: 20 μl, and column temperature: 40° C.

Example 1

A reaction flask equipped with a stirring apparatus, thermometer, dripping funnel, reflux condenser, and nitrogen inlet tube was charged with a mixture solution comprising 31 parts of ethylamine (as a 70% aqueous solution) and 32 parts of ammonia (as a 28% aqueous solution), which was stirred to obtain a homogeneous solution. While maintaining the temperature at 45° C. or lower, a mixture solution comprising 69 parts of glyoxal (as a 40% aqueous solution) and 71 parts of acetaldehyde (as a 30% aqueous solution) was added thereto dropwise using the dripping funnel. The dropwise addition of the mixture solution comprising glyoxal and acetaldehyde was conducted over 5 hours, and after completion of the addition, the mixture was subjected to reaction at 40° C. for 1 hour to obtain a mixture (M-1) comprising 1-ethyl-2-methylimidazole (a-1) and 1-ethylimidazole (b-1). The obtained mixture was analyzed with HPLC to find that the weight ratio of (a-1) to (b-1) was 80:20. Then, the mixture was depressurized gradually from the normal pressure to 5.0 kPA at 80° C. and dehydrated, and subsequently purified by distillation at 105° C. under a pressure of 1.0 kPA to obtain a mixture (M-2). The obtained mixture was analyzed with HPLC to find that the weight ratio of (a-1) to (b-1) was 85:15.

Thereafter, in a stainless steel autoclave equipped with a reflux condenser, 100 parts of the obtained mixture (M-2), 135 parts of dimethyl carbonate, and 192 parts of methanol were charged and the content was dissolved homogeneously. Then, the mixture was heated to 130° C. and subjected to reaction at a pressure of 0.8 MPA for 80 hours. The reaction product was analyzed with NMR to find that 1-ethyl-2,3-dimethylimidazolium monomethyl carbonate and 1-ethyl-3-dimethylimidazolium monomethyl carbonate were produced. 427 parts of the obtained reaction mixture were taken into a flask, and while stirring, 207 parts of an aqueous solution of fluoroboric acid (purity 42% by weight) were gradually added thereto dropwise over about 30 minutes at room temperature. Carbon dioxide was generated during the dropwise addition. After the bubbling stopped, the reaction solution was transferred into a rotary evaporator and the solvent was totally removed. In the flask, 83 parts of a yellowish brown substance were left. This substance was analyzed with NMR to find that the main components thereof were 1-ethyl-2,3-dimethylimidazolium tetrafluoroborate (hereinafter, referred to as "EDMI") and 1-ethyl-3-methylimidazolium tetrafluoroborate (hereinafter, referred to as "EMI"). By the HPLC analysis, the weight ratio between them was found to be 85:15. 210 g of the obtained mixture comprising EDMI and EMI was dissolved in propylene carbonate homogeneously so as to adjust the total amount to 1 liter to prepare the electrolyte solution of the present invention.

Example 2

The mixture (M-2) comprising 1-ethyl-2-methylimidazole (a-1) and 1-ethylimidazole (b-1), obtained in Example 1, was further purified by distillation under the temperature and pressure conditions of 105° C. and 1.0 kPA to obtain a mixture (M-3) comprising (a-1) and (b-1). The obtained mixture was analyzed with HPLC to find that the weight ratio of (a-1) to (b-1) was 90:10. Said mixture was treated in the same manner as in Example 1 to obtain a yellowish brown substance. This substance was analyzed with NMR to find that the main components thereof were EDMI and EMI and, with the HPLC analysis, to find that the weight ratio between them was 90:10. 211 g of the obtained mixture comprising EDMI and EMI was dissolved in propylene carbonate homogeneously so as to adjust the total amount to 1 liter to prepare the electrolyte solution of the present invention.

Example 3

The mixture (M-3) comprising 1-ethyl-2-methylimidazole (a-1) and 1-ethylimidazole (b-1), obtained in Example 2, was further purified by distillation under the temperature and pressure conditions of 105° C. and 1.0 kPA to obtain a mixture (M-4) comprising (a-1) and (b-1). The obtained mixture was analyzed with HPLC to find that the weight ratio of (a-1) to (b-1) was 95:5. Said mixture was treated in the same manner as in Example 1 to obtain a yellowish brown substance. This substance was analyzed with NMR to find that the main components thereof were EDMI and EMI and, with the HPLC analysis, to find that the weight ratio between them was 95:5. 211 g of the obtained mixture comprising EDMI and EMI was dissolved in propylene carbonate homogeneously so as to adjust the total amount to 1 liter to prepare the electrolyte solution of the present invention.

Example 4

The mixture (M-4) comprising 1-ethyl-2-methylimidazole (a-1) and 1-ethylimidazole (b-1), obtained in Example 3, was further purified by distillation under the temperature and pressure conditions of 105° C. and 1.0 kPA to obtain a mixture (M-5) comprising (a-1) and (b-1). The obtained mixture was analyzed with HPLC to find that the weight ratio of (a-1) to (b-1) was 98:2. Said mixture was treated in the same manner as in Example 1 to obtain a yellowish brown substance. This substance was analyzed with NMR to find that the main components thereof were EDMI and EMI and, with the HPLC analysis, to find that the weight ratio between them was 98:2. 212 g of the obtained mixture comprising EDMI and EMI was dissolved in propylene carbonate homogeneously so as to adjust the total amount to 1 liter to prepare the electrolyte solution of the present invention.

Example 5

The mixture (M-5) comprising 1-ethyl-2-methylimidazole (a-1) and 1-ethylimidazole (b-1), obtained in Example 4, was further purified by distillation under the temperature and pressure conditions of 105° C. and 1.0 kPA to obtain a mixture (M-6) comprising (a-1) and (b-1). The obtained mixture was analyzed with HPLC to find that the weight ratio of (a-1) to (b-1) was 98.5:1.5. Said mixture was treated in the same manner as in Example 1 to obtain a yellowish brown substance. This substance was analyzed with NMR to find that the main components thereof were EDMI and EMI and, with the HPLC analysis, to find that the weight ratio between them was 98.5:1.5. 212 g of the obtained mixture comprising EDMI and EMI was dissolved in propylene carbonate homogeneously so as to adjust the total amount to 1 liter to prepare the electrolyte solution of the present invention.

Example 6

The mixture (M-6) comprising 1-ethyl-2-methylimidazole (a-1) and 1-ethylimidazole (b-1), obtained in Example 5, was further purified by distillation under the temperature and pressure conditions of 105° C. and 1.0 kPA to obtain a mixture (M-7) comprising (a-1) and (b-1). The obtained mixture was analyzed with HPLC to find that the weight ratio of (a-1) to (b-1) was 99:1. Said mixture was treated in the same manner as in Example 1 to obtain a yellowish brown substance. This substance was analyzed with NMR to find that the main components thereof were EDMI and EMI and, with the HPLC analysis, to find that the weight ratio between them was 99:1. 212 g of the obtained mixture comprising EDMI and EMI was dissolved in propylene carbonate homogeneously so as to adjust the total amount to 1 liter to prepare the electrolyte solution of the present invention.

Example 7

The mixture (M-7) comprising 1-ethyl-2-methylimidazole (a-1) and 1-ethylimidazole (b-1), obtained in Example 6, was further purified by distillation under the temperature and pressure conditions of 105° C. and 1.0 kPA to obtain a mixture (M-8) comprising (a-1) and (b-1). The obtained mixture was analyzed with HPLC to find that the weight ratio of (a-1) to (b-1) was 99.6:0.4. Said mixture was treated in the same manner as in Example 1 to obtain a yellowish brown substance. This substance was analyzed with NMR to find that the main components thereof were EDMI and EMI and, with the HPLC analysis, to find that the weight ratio between them was 99.6:0.4. 212 g of the obtained mixture comprising EDMI and EMI was dissolved in propylene carbonate homogeneously so as to adjust the total amount to 1 liter to prepare the electrolyte solution of the present invention.

Example 8

The mixture (M-7) comprising 1-ethyl-2-methylimidazole (a-1) and 1-ethylimidazole (b-1) (the weight ratio of (a-1) to (b-1) is 99:1), obtained in Example 6, was treated in the same manner as in Example 1 except that 241 parts of an aqueous solution of $HPF_6$ (purity 60% by weight) was used in lieu of an aqueous solution of fluoroboric acid (purity 42% by weight). The resultant was analyzed with NMR to find that the main components thereof were 1-ethyl-2,3-dimethylimidazolium hexafluorophosphonate (hereinafter, referred to as "EDMIP") and 1-ethyl-3-methyl hexafluorophosphonate (hereinafter, referred to as "EMIP") and, with the HPLC analysis, to find that the weight ratio between them was 99:1. 270 g of the obtained mixture comprising EDMIP and EMIP was dissolved in propylene carbonate homogeneously so as to adjust the total amount to 1 liter to prepare the electrolyte solution of the present invention.

Example 9

A mixture comprising 1,2-dimethylimidazole (a-2) and 1-methylimidazole (b-2) was obtained in the same manner as in Example 1 except that 38 parts of methylamine (as a 40% aqueous solution) was used in lieu of ethylamine (as a 70% aqueous solution). The obtained mixture was analyzed with HPLC, and the weight ratio of (a-2) to (b-2) was found to be 80:20. The mixture was further purified by distillation under the temperature and pressure conditions of 100° C. and 1.0 kPA, and the weight ratio of (a-2) to (b-2) after the purification was 85:15 (M-9). The obtained mixture was treated in the same manner as in Example 1 to obtain a mixture comprising 1,2,3-trimethylimidazolium tetrafluoroborate (hereinafter, referred to as "TMI") and 1,3-dimethylimidazolium tetrafluoroborate (hereinafter, referred to as "DMI"). By the HPLC analysis, the weight ratio between them was found to be 85:15. 198 g of the obtained mixture comprising TMI and DMI was dissolved in propylene carbonate homogeneously so as to adjust the total amount to 1 liter to prepare the electrolyte solution of the present invention.

Example 10

The mixture (M-9) comprising 1,2-dimethylimidazole (a-2) and 1-methylimidazole (b-2), obtained in Example 9, was further purified by distillation under the temperature and pressure conditions of 100° C. and 1.0 kPA to obtain a mixture (M-10) comprising (a-2) and (b-2). The obtained mixture was analyzed with HPLC and to find that the weight ratio of (a-2) to (b-2) was 99:1. Said mixture was treated in the same manner as in Example 1. The resultant was analyzed with NMR to find that the main components thereof were TMI and DMI and, with the HPLC analysis, to find that the weight ratio between them was 99:1. 198 g of the obtained mixture comprising TMI and DMI was dissolved in propylene carbonate homogeneously so as to adjust the total amount to 1 liter to prepare the electrolyte solution of the present invention.

Example 11

The same procedure as in Example 1 was performed except that 38 parts of methylamine (as a 40% aqueous solution) was used in lieu of ethylamine (as a 70% aqueous solution), and 87 parts of methyl glyoxal was used in lieu of glyoxal (as a 40% aqueous solution). After the dropwise addition, a mixture comprising 1,2,4-trimethylimidazole (a-3) and 1,4-dimethylimidazole (b-3) was obtained. The obtained mixture was analyzed with HPLC to find that the weight ratio of (a-3) to (b-3) was 80:20. The mixture was further purified by distillation under the temperature and pressure conditions of 110° C. and 1.0 kPA, and the weight ratio of (a-3) to (b-3) after the purification was 85:15 (M-11). The obtained mixture was treated in the same manner as in Example 1 to obtain a mixture comprising 1,2,3,4-tetramethylimidazolium tetrafluoroborate (hereinafter, referred to as "TeMI") and 1,3,4-trimethylimidazolium tetrafluoroborate (hereinafter, referred to as "4TMI"). By the HPLC analysis, the weight ratio between them was found to be 85:15. 212 g of the obtained mixture comprising TeMI and 4TMI was dissolved in propylene carbonate homogeneously so as to adjust the total amount to 1 liter to prepare the electrolyte solution of the present invention.

Example 12

The mixture (M-11) comprising 1,2,4-trimethylimidazole (a-3) and 1,4-dimethylimidazole (b-3), obtained in Example 11, was further purified by distillation under the temperature and pressure conditions of 110° C. and 1.0 kPA to obtain a mixture (M-12) comprising (a-3) and (b-3). The obtained mixture was analyzed with HPLC to find that the weight ratio of (a-3) to (b-3) was 99:1. Said mixture was treated in the same manner as in Example 1. The resultant was analyzed with NMR to find that the main components thereof were TeMI and 4TMI and, with the HPLC analysis, to find that the weight ratio between them was 99:1. 212 g of the obtained mixture comprising TeMI and 4TMI was dissolved in propylene carbonate homogeneously so as to adjust the total amount to 1 liter to prepare the electrolyte solution of the present invention.

Example 13

210 g of the mixture comprising EDMI and EMI obtained in Example 1 was dissolved homogeneously in sulfolane so as to adjust the total amount to 1 liter to prepare the electrolyte solution of the present invention.

Example 14

211 g of the mixture comprising EDMI and EMI obtained in Example 2 was dissolved homogeneously in sulfolane so as to adjust the total amount to 1 liter to prepare the electrolyte solution of the present invention.

Example 15

211 g of the mixture comprising EDMI and EMI obtained in Example 3 was dissolved homogeneously in sulfolane so as to adjust the total amount to 1 liter to prepare the electrolyte solution of the present invention.

Example 16

210 g of the mixture comprising EDMI and EMI obtained in Example 1 was dissolved homogeneously in a mixed solvent comprising propylene carbonate and dimethyl carbonate (weight ratio 6:4) so as to adjust the total amount to 1 liter to prepare the electrolyte solution of the present invention.

Example 17

211 g of the mixture comprising EDMI and EMI obtained in Example 2 was dissolved homogeneously in a mixed solvent comprising propylene carbonate and dimethyl carbonate (weight ratio 6:4) so as to adjust the total amount to 1 liter to prepare the electrolyte solution of the present invention.

Example 18

211 g of the mixture comprising EDMI and EMI obtained in Example 3 was dissolved homogeneously in a mixed solvent comprising propylene carbonate and dimethyl carbonate (weight ratio 6:4) so as to adjust the total amount to 1 liter to prepare the electrolyte solution of the present invention.

Example 19

211 g of the mixture comprising EDMI and EMI obtained in Example 4 was dissolved homogeneously in a mixed solvent comprising propylene carbonate and dimethyl carbonate (weight ratio 7:3) so as to adjust the total amount to 1 liter to prepare the electrolyte solution of the present invention.

Example 20

210 g of the mixture comprising EDMI and EMI obtained in Example 1 was dissolved homogeneously in a mixed solvent comprising propylene carbonate and ethylmethyl carbonate (weight ratio 7:3) so as to adjust the total amount to 1 liter to prepare the electrolyte solution of the present invention.

Example 21

211 g of the mixture comprising EDMI and EMI obtained in Example 2 was dissolved homogeneously in a mixed solvent comprising propylene carbonate and ethylmethyl carbonate (weight ratio 7:3) so as to adjust the total amount to 1 liter to prepare the electrolyte solution of the present invention.

Example 22

211 g of the mixture comprising EDMI and EMI obtained in Example 3 was dissolved homogeneously in a mixed solvent comprising propylene carbonate and ethylmethyl carbonate (weight ratio 7:3) so as to adjust the total amount to 1 liter to prepare the electrolyte solution of the present invention.

Comparative Example 1

A reaction flask equipped with a stirring apparatus, thermometer, dripping funnel, reflux condenser, and nitrogen inlet tube was charged with a mixture solution comprising 18 parts of glyoxal (as a 40% aqueous solution) and 10 parts of formalin (as a 37% aqueous solution), which was stirred to obtain a homogeneous solution. While maintaining the temperature from 35° C. to 45° C., a mixture solution comprising 64 parts of ethylamine (as a 70% aqueous solution) and 61 parts of ammonia (as a 28% aqueous solution) was added thereto dropwise using the dripping funnel. The dropwise addition of the mixture solution comprising ethylamine and ammonia was carried out over 5 hours, and after completion of the addition, the mixture was subjected to reaction at 40° C. for 1 hour. Then, the mixture was depressurized gradually from the normal pressure to 5.0 kPA at 80° C. and dehydrated, and subsequently purified by distillation at 100° C. under a pressure of 0.8 kPA to obtain 1-ethylimidazole (b-1). Next, to a stainless autoclave equipped with a reflux condenser, 96 parts of (b-1) obtained, 135 parts of dimethyl carbonate and 192 parts of methanol were charged and the content was dissolved homogeneously. Then, the mixture was heated to 130° C., and subjected to reaction at a pressure of 0.8 MPA for 80 hours. The reaction product was analyzed with NMR to find that 1-ethyl-3-dimethylimidazolium monomethyl carbonate (2) was generated. 423 parts of the reaction product (2) obtained was taken into a flask, and while stirring, 209 parts of an aqueous solution of fluoroboric acid (purity 42% by weight) were gradually added dropwise over about 30 minutes at room temperature. During the dropwise addition, carbon dioxide was generated. After the bubbling stopped, the reaction solution was transferred into a rotary evaporator and the solvent was totally removed. In the flask, 198 parts of a transparent colorless liquid (3) were left. This liquid was analyzed with HPLC to find that the main component thereof was EMI. 198 g of the obtained liquid (3) was dissolved in propylene carbonate homogeneously so as to adjust the total amount to 1 liter to prepare an electrolyte solution.

Comparative Example 2

The mixture comprising EDMI and EMI obtained in Example 1 and EMI obtained in Comparative Example 1 were mixed so as to adjust the weight ratio of EDMI to EMI to fall in 50:50. By the HPLC, the weight ratio was confirmed to be 50:50. 205 g of the obtained mixture was dissolved homogeneously in propylene carbonate so as to adjust the total amount to 1 liter to prepare an electrolyte solution.

Comparative Example 3

The mixture (M-1) comprising 1-ethyl-2-methylimidazole (a-1) and 1-ethylimidazole (b-1), obtained in Example 1, was subjected to simple distillation, and then methylated and added with fluoroboric acid dropwise in the same manner as in Example 1 to obtain a mixture comprising EDMI and EMI. By the HPLC analysis, the weight ratio between them in the obtained mixture was found to be 80:20. 208 g of the mixture comprising EDMI and EMI was dissolved homogeneously in propylene carbonate so as to adjust the total amount to 1 liter to prepare an electrolyte solution.

Comparative Example 4

205 g of the mixture comprising EDMI and EMI obtained in Comparative Example 2 was dissolved in sulfolane homogeneously so as to adjust the total amount to 1 liter to prepare an electrolyte solution.

Comparative Example 5

208 g of the mixture comprising EDMI and EMI obtained in Comparative Example 3 was dissolved in sulfolane homogeneously so as to adjust the total amount to 1 liter to prepare an electrolyte solution.

Comparative Example 6

205 g of the mixture comprising EDMI and EMI obtained in Comparative Example 2 was dissolved in a mixed solvent comprising propylene carbonate and dimethyl carbonate (weight ratio 6:4) so as to adjust the total amount to 1 liter to prepare an electrolyte solution.

Comparative Example 7

208 g of the mixture comprising EDMI and EMI obtained in Comparative Example 3 was dissolved in a mixed solvent comprising propylene carbonate and dimethyl carbonate (weight ratio 6:4) so as to adjust the total amount to 1 liter to prepare an electrolyte solution.

Comparative Example 8

205 g of the mixture comprising EDMI and EMI obtained in Comparative Example 2 was dissolved in a mixed solvent comprising propylene carbonate and ethylmethyl carbonate (weight ratio 7:3) so as to adjust the total amount to 1 liter to prepare an electrolyte solution.

Comparative Example 9

208 g of the mixture comprising EDMI and EMI obtained in Comparative Example 3 was dissolved in a mixed solvent comprising propylene carbonate and ethylmethyl carbonate (weight ratio 7:3) so as to adjust the total amount to 1 liter to prepare an electrolyte solution.

The impurity contents in the electrolyte solutions prepared in Examples 1 to 22 and Comparative Examples 1 to 9 were as follows, respectively. The water content was not more than 10 ppm. The tertiary amine salt content was not more than 1 mmol/kg, the content of hydrolysate of $BF_4^-$ was not more than 100 ppm, the content of sulfuric acid and sulfate was not more than 1 ppm, the glycol content was not more than 10 ppm, and the ion content of each sodium, magnesium, potassium, chromium, manganese, iron, cobalt, nickel, copper, zinc, or lead was not more than 1 ppm.

Using each of the electrolyte solutions obtained in Examples 1 to 22 and Comparative Examples 1 to 9, spiral electric double layer condenser (size; $\phi$ 18 mm×L 50 mm, rated voltage; 2.5 V) was produced. And using each of these spiral electric double layer condensers, the electric strength of each electrolyte solutions was evaluated by determining the self-discharge properties (residual voltage after self-discharge). Table 1 shows the residual voltage after self-discharge.

Next, the method for determining the self-discharge property is described. Each of the spiral electric double layer condensers produced as mentioned above, charged at 2.5 V at room temperature (25° C.) for 24 hours, was left to stand for 50 hours at room temperature, and then the voltage between the terminals of the spiral electric double layer condensers was determined. The voltage between the terminals obtained in this determination after 24 hours was set as the residual voltage. The higher residual voltage value is, the higher electric strength is, and the lower residual voltage value is, the lower electric strength is.

Using each of the above spiral electric double layer condensers, a high-temperature load test was conducted at 65° C. and 2.5 V, and the capacity retention after the lapse of 1000 hours was calculated. The results are shown in Table 1.

Capacity retention(%)=[(capacity after the lapse of 1000 hours)/(the initial capacity)]×100

In the following, the method for measuring the capacity is described. Each of the spiral electric double layer condensers, charged for 1 hour at 2.5 V at room temperature, was subjected to a constant current discharge at 500 mA using a constant current loading equipment. And the capacity was calculated from the time that the voltage between the terminals of each of the spiral electric double layer condensers changed from 1.5 V to 1.0 V. The capacity is determined by the formula: $C=i\times\Delta t/\Delta V$ (derived from the relation of $Q=i\times t=C\times V$). In this measurement, the following relations were set: $i=0.5(A)$ and $\Delta V=1.5-1.0=0.5(V)$. Herein, Q represents discharge content (C), i represents discharge current (A), t represents discharge time (sec), C represents capacity (F), and V represents voltage (V).

TABLE 1

| | ①EDMI/EMI ②EDMIP/EMIP ③TMI/DMI ④TeMI/4TMI | Solvent | Residual voltage (V) | Capacity retention (%) |
|---|---|---|---|---|
| Example 1 | ①85/15 | PC | 2.40 | 91 |
| Example 2 | ①90/10 | PC | 2.41 | 92 |
| Example 3 | ①95/5 | PC | 2.42 | 94 |
| Example 4 | ①98/2 | PC | 2.43 | 96 |
| Example 5 | ①98.5/1.5 | PC | 2.43 | 97 |
| Example 6 | ①99/1 | PC | 2.43 | 97 |
| Example 7 | ①99.6/0.4 | PC | 2.43 | 98 |
| Example 8 | ②99/1 | PC | 2.42 | 96 |
| Example 9 | ③85/15 | PC | 2.40 | 90 |
| Example 10 | ③99/1 | PC | 2.42 | 96 |
| Example 11 | ④85/15 | PC | 2.40 | 90 |
| Example 12 | ④99/1 | PC | 2.42 | 96 |
| Example 13 | ①85/15 | SL | 2.40 | 92 |
| Example 14 | ①90/10 | SL | 2.40 | 93 |
| Example 15 | ①95/5 | SL | 2.41 | 94 |
| Example 16 | ①85/15 | PC/DMC | 2.42 | 92 |
| Example 17 | ①90/10 | PC/DMC | 2.42 | 93 |
| Example 18 | ①95/5 | PC/DMC | 2.43 | 95 |
| Example 19 | ①98/2 | PC/DMC | 2.43 | 97 |
| Example 20 | ①85/15 | PC/EMC | 2.41 | 93 |
| Example 21 | ①90/10 | PC/EMC | 2.41 | 94 |
| Example 22 | ①95/5 | PC/EMC | 2.42 | 95 |
| Compar. Ex. 1 | ①0/100 | PC | 2.25 | 80 |
| Compar. Ex. 2 | ①50/50 | PC | 2.30 | 83 |
| Compar. Ex. 3 | ①80/20 | PC | 2.34 | 86 |
| Compar. Ex. 4 | ①50/50 | SL | 2.28 | 84 |
| Compar. Ex. 5 | ①80/20 | SL | 2.32 | 86 |
| Compar. Ex. 6 | ①50/50 | PC/DMC | 2.34 | 85 |
| Compar. Ex. 7 | ①80/20 | PC/DMC | 2.37 | 88 |
| Compar. Ex. 8 | ①50/50 | PC/EMC | 2.32 | 85 |
| Compar. Ex. 9 | ①80/20 | PC/EMC | 2.36 | 88 |

The abbreviations in Table 1 represent the nonaqueous solvents mentioned below.
PC: propylene carbonate
SL: sulfolane
DMC: dimethyl carbonate
EMC: ethylmethyl carbonate From Table 1, each of the electric double layer condensers, according to the present invention, respectively containing the electrolyte solution prepared in Examples 1 to 22 is higher in residual voltage and capacity retention after self-discharge compared with the electric double layer condensers containing the electrolyte solutions prepared in Comparative Examples 1 to 9. Accordingly, the electrolyte solution of the present invention can enhance the electric strength of an electrochemical capacitor and suppress the time degradation in its performance, thereby a highly reliable electrochemical capacitor can be obtained by using the same.

INDUSTRIAL APPLICABILITY

Since the electrolyte solution of the present invention is excellent in electric strength, an electrochemical device, especially an electrochemical capacitor, containing this electrolyte solution shows only slight time degradation in its performance compared with a conventional electrochemical device. Accordingly, the electrolyte solution of the present invention can be applied as memory backup means in various electronics, as backup power sources for various power supply sources, as storage batteries to serve as substitutes for secondary batteries such as storage elements used in combination with solar cells, as power sources for high current-requiring motors, as power sources for power tools such as electric tools, and as power supply sources for electric vehicles.

The invention claimed is:

1. An electrolyte solution for electrochemical device which comprises an imidazolium salt (A) represented by the general formula (1) as a main component and an imidazolium salt (B) represented by the general formula (2),
wherein the content of the imidazolium salt (B) represented by the general formula (2) is not more than 15% by weight to the total weight of the imidazolium salt (A) and imidazolium salt (B);

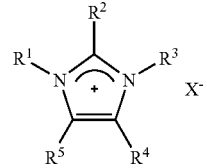

(1)

(in the formula, $R^1$, $R^2$ and $R^3$ may be the same or different and each represents an alkyl group containing 1 to 3 carbon atoms; $R^4$ and $R^5$ may be the same or different and each represents an hydrogen atom or an alkyl group containing 1 to 3 carbon atoms; and $X^-$ represents a counter anion)

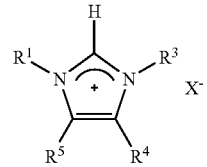

(2)

(in the formula, $R^1$, $R^3$, $R^4$, $R^5$ and $X^-$ are the same as the definition for the general formula (1)).

2. The electrolyte solution according to claim 1, wherein the counter anion $X^-$ is an anion represented by $PF_6^-$, $BF_4^-$, $AsF_6^-$, $SbF_6^-$, $N(RfSO_2)_2^-$, $C(RfSO_2)_3^-$, $RfSO_3^-$ (Rf is a fluoroalkyl group containing 1 to 12 carbon atoms), $N(FSO_2)_2^-$, $F^{-1}$, $ClO_4^-$, $AlF_4^-$, $AlCl_4^-$, $TaF_6^-$, $NbF_6^-$, $SiF_6^-$, $CN^-$ or $F(HF)_n^-$ (n is a number of 1 to 4).

3. The electrolyte solution according to claim 1, wherein the imidazolium salt (A) is a compound obtainable by quaternizing an imidazole (a) which is obtained by reacting an α-dicarbonyl compound or its acetals or ketals (d1), ammonia or its carbonate (d2), aldehydes (d3) and primary amines (d4).

4. The electrolyte solution according to claim 1, wherein the content of the imidazolium salt (B) is not lower than 0.1% by weight but not more than 15% by weight to the total weight of the imidazolium salt (A) and imidazolium salt (B).

5. The electrolyte solution according to claim 1, wherein at least one alkyl group among alkyl groups as $R^1$, $R^2$ and $R^3$ in the general formula (1) is different from the other ones.

6. The electrolyte solution according to claim 1, wherein the imidazolium salt (A) contains at least one cation selected from the group consisting of 1-ethyl-2,3-dimethylimidazolium, 1,2,3-trimethylimidazolium and 1,2,3,4-tetramethylimidazolium.

7. The electrolyte solution according to claim 1, which further comprises a nonaqueous solvent.

8. The electrolyte solution according to claim 7, which comprises at least one nonaqueous solvent selected from the group consisting of propylene carbonate, ethylene carbonate, butylene carbonate, sulfolane, methyl sulfolane, acetonitrile, γ-butyrolactone, dimethyl carbonate, ethylmethyl carbonate and diethyl carbonate.

9. An electrochemical device which comprises the electrolyte solution according to claim 1.

10. An electric double layer condenser which comprises the electrolyte solution according to claim 1.

\* \* \* \* \*